United States Patent [19]

Cornelison et al.

[11] Patent Number: 5,170,624
[45] Date of Patent: Dec. 15, 1992

[54] COMPOSITE CATALYTIC CONVERTER

[75] Inventors: Richard C. Cornelison, Hiram; William A. Whittenberger, Ravenna, both of Ohio

[73] Assignee: W. R. Grace & Co.-Conn., New York, N.Y.

[21] Appl. No.: 680,763

[22] Filed: Apr. 5, 1991

[51] Int. Cl.⁵ .............................................. F01N 3/28
[52] U.S. Cl. .................................... 60/300; 422/174; 422/180; 502/527
[58] Field of Search ............... 60/299, 300; 422/180, 422/174; 502/527

[56] References Cited

U.S. PATENT DOCUMENTS

| | | | |
|---|---|---|---|
| 3,723,070 | 3/1973 | Houdry . | |
| 3,768,982 | 10/1973 | Kitzner . | |
| 3,770,389 | 10/1973 | Kitzner . | |
| 3,857,680 | 12/1974 | Porta et al. . | |
| 3,886,739 | 6/1975 | Lee | 60/286 |
| 3,889,464 | 6/1975 | Gardner | 60/286 |
| 3,916,057 | 10/1975 | Hatch | 428/236 |
| 3,992,330 | 11/1976 | Noakes | 252/466 J |
| 4,015,566 | 4/1977 | Wahl . | |
| 4,023,928 | 5/1977 | Haensel | 21/74 R |
| 4,029,974 | 6/1977 | Brokaw | 307/296 R |
| 4,078,379 | 3/1978 | Minami et al. | 60/276 |
| 4,102,127 | 7/1978 | Saiki et al. | 60/284 |
| 4,186,172 | 1/1980 | Scholz | 422/180 |
| 4,272,668 | 6/1981 | Johnson et al. | 219/375 |
| 4,273,681 | 6/1981 | Nonnenmann | 502/527 |
| 4,277,442 | 7/1981 | Hergart | 422/119 |
| 4,381,590 | 5/1983 | Nonnenmann . | |
| 4,414,023 | 11/1988 | Aggen et al. | 75/124 |
| 4,598,063 | 7/1986 | Retallick | 502/439 |
| 4,619,912 | 10/1986 | Jalbina | 502/527 |
| 4,693,078 | 9/1987 | Dettling et al. | 60/295 |
| 4,702,892 | 10/1987 | Betz | 422/171 |
| 4,711,009 | 12/1987 | Cornelison et al. . | |
| 4,847,966 | 7/1989 | Kuchelmeister . | |
| 4,852,530 | 8/1989 | John | 123/145 A |
| 4,928,485 | 5/1990 | Whittenberger | 422/180 |
| 4,976,929 | 12/1990 | Cornelison | 60/299 |
| 5,070,694 | 12/1991 | Whittenberger | 60/300 |

FOREIGN PATENT DOCUMENTS

| | | | |
|---|---|---|---|
| 1160161 | 1/1984 | Canada | 422/180 |
| WO89/10470 | 11/1989 | Fed. Rep. of Germany . | |
| WO89/10471 | 11/1989 | Fed. Rep. of Germany . | |
| 1-193012 | 8/1989 | Japan | 422/180 |
| 1-193013 | 8/1989 | Japan | 422/180 |

OTHER PUBLICATIONS

"Recent Developments in Electrically Heated Metal Monoliths" Whittenberger et al.; SAE Technical Paper Series 900503, Feb. 26, 1990.
Abstract of DE34463-12-A Jun. 26, 1986.
Abstract DE3731888 A Jan. 13, 1989.

*Primary Examiner*—Douglas Hart
*Attorney, Agent, or Firm*—Edward J. Cabic

[57] ABSTRACT

There is provided a core element for an electrically heatable catalytic converter, and an electrically heatable catalytic converter containing the same, the core element being characterized by a corrugated thin metal foil strip, preferably herringbone corrugated, and in laminar relationship therewith, a flat thin metal foil strip of either stainless steel or brazing metal, or a combination of both, the flat thin metal foil strip having a width less than the width of the corrugated thin metal foil strip. The strips are then spirally wound, or accordion folded to form a monolith, and suitably connected to a voltage source to supply electrical power to the unit.

27 Claims, 4 Drawing Sheets

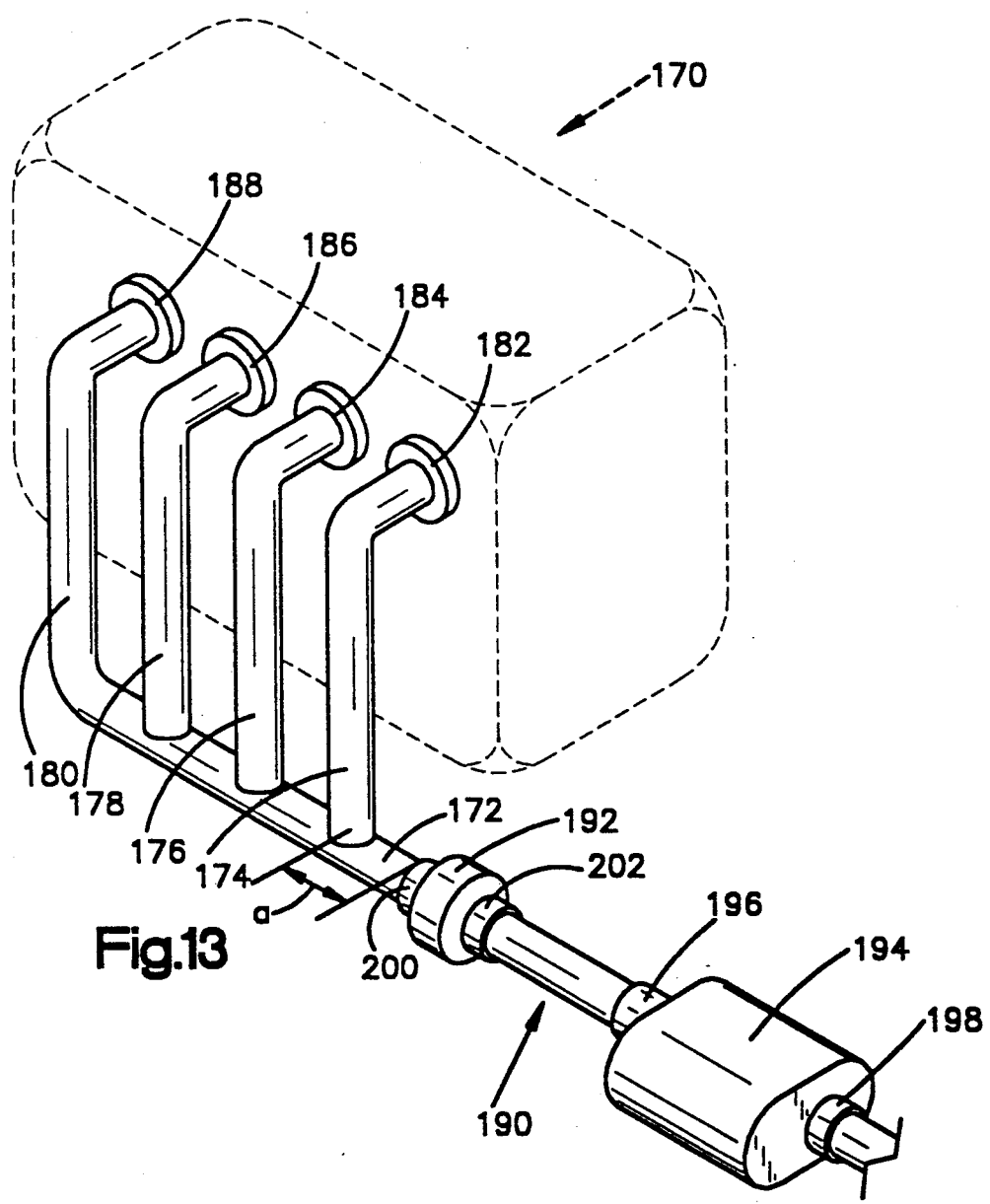

COMPOSITE CATALYTIC CONVERTER

This invention relates to a composite catalytic converter for use in an exhaust system from an internal combustion engine and, more particularly, to an electrically heatable composite catalytic converter for converting pollutants in an exhaust gas stream to yield a more environmentally acceptable exhaust.

BACKGROUND OF THE INVENTION AND PRIOR ART

The purpose of a catalytic converter is to facilitate the conversion of pollutant materials in internal combustion engine exhaust, e.g., carbon monoxide, unburned hydrocarbons, nitrogen oxides, ozone, etc. to carbon dioxide, water and other harmless gasses. Conventional catalytic converters utilize a ceramic honeycomb monolith having square, triangular, or circular openings straight-through openings or cells, catalyst coated alumina beads, or a corrugated thin metal foil honeycomb monolith, having a catalyst carried on or supported by the surface, which surface is, in the case of the thin metal honeycomb monolith, typically washcoated with one or more refractory metal oxides, e.g., alumina (gamma), ceria, lanthia, or combinations thereof, and a catalyst. The catalyst is normally a noble metal, e.g., platinum, palladium, rhodium, ruthenium, or a mixture of two or more of such metals. The catalyst may also be manganese hexa-aluminate developed by Kobe Steel, Ltd. The catalyst catalyzes a chemical reaction whereby the pollutant material is converted to a harmless by-product which then passes through the exhaust system to the atmosphere.

However, this conversion is not efficient initially when the exhaust gases are relatively cold. To have high conversion efficiency at, for example, start-up, the catalyst and the surface of the converter with which the exhaust gases come in contact must be at a minimum elevated temperature, e.g., 390 F for carbon monoxide, 570 F. for volatile organic compounds (VOC), and 1000 F for methane or natural gas. Otherwise, the conversion to harmless by-products is poor and cold start pollution of the atmosphere is high. Once the exhaust system has come to its normal operating temperature, the catalytic converter is optimally effective. Hence, it is necessary for the relatively cold exhaust gases to contact hot catalyst to effect satisfactory conversion at start-up. A thin metal honeycomb having a catalyst deposited on the surface thereof is especially adapted to this purpose in that it can be heated readily by electrical means as later described herein.

To achieve rapid heating of the catalyst in a metallic monolith by electrical means, it is necessary to draw a large amount of power from a voltage source or another source of electrical energy, e.g., a battery or a capacitor device, such as new Isuzu "electric power storage" device developed by Isuzu Motors Ltd., for a short period of time until the desired catalyst temperature is reached. In an automotive vehicle, for example, this source of energy is usually a 12 volt or 24 volt battery, although a battery system supplying up to as much as 108 volts may be used herein. To accomplish a high power draw on a storage battery system, it has been found that one or more actuatable solid state switches connected in parallel, such as metal oxide semiconductor field effect transistors (MOSFETs) together with means for actuating such devices in unison (a gate driver) may conveniently be used. Such a system enables drawing high power loads for a short period of time to achieve the desired catalyst temperature in from 2 to 30 seconds. Reference may be had to our copending application Ser. No. 587,219 filed Sep. 24, 1990 for details of a suitable power control system useful herein.

Reference may be had to U.S. Pat. No. 3,768,982 to Kitzner dated Oct. 30, 1973. In this patent heat from a centrally located electric heater is transferred by conduction through a monolithic catalyst support to heat the catalyst to optimum operating temperature. Reference may also be had to U.S. Pat. No. 3,770,982 to Kitzner dated Oct. 30, 1973 which discloses a central electrically heated core within a ceramic monolith, heat being transmitted by conduction to the catalyst contained in the openings of the ceramic monolith. The heating core is formed of metal sheets, one corrugated and the other flat, coated with alumina and also bearing a catalyst. The metallic core is heated electrically by virtue of its own electrical resistance. However, heating by conduction requires too long a period (a matter of minutes) to be practical in solving the problem of atmospheric pollution at start-up.

Reference may also be had to U.S. Pat. No. 4,711,009 to Cornelison, et al dated Dec. 8, 1987 for details of a process for the preparation of a continuous corrugated thin stainless steel strip having a wash coat of alumina (gamma) on at least one surface of the strip, and a noble metal catalyst deposited on the resulting surface thereof. This patent is incorporated herein by reference thereto.

Reference may also be had to International PCT publication numbers WO 89/10470 and WO 89/10471 each filed Nov. 2, 1989 which disclose electrically conductive honeycomb catalyst support units useful in automobiles. S-wound cores are disclosed in these publications. No brazing between corrugated thin metal foil layers is disclosed. To obtain a suitable resistance between 0.03 and 2 ohms, the honeycomb body is subdivided electrically, cross-sectionally and/or axially, by gaps and/or electrically insulating intermediate layers or coatings so that at least one path having the desired resistance is obtained. Heating is controlled by a timed relay. Separate catalytic converters in the exhaust line, one or more electrically heatable, the other conventional, are disclosed. The minimum resistance disclosed is 0.03 ohms which when placed in a 12 volt electrical system as disclosed, may be expected to draw no more than about 300 amps at the catalyst when the various voltage drops and resistances are considered. This power level (about 2700 watts) has been found to be too low for effective rapid heating of electrically heatable catalytic converters within from 2 to 30 seconds. Even if the monolith could be heated rapidly at this power level, the catalyst would rapidly cool to below the "light off" temperature after the engine is started because of the initial cool exhaust gas from the engine. To counteract this cooling effect, usually more than 2700 watts of power are required after engine start-up. It should be noted that on some vehicles, this cooling to lower temperature is not important if it occurs during a period of time when the engine exhaust emissions are low, in which case a lower power level may suffice. Moreover, subdivision of the monolith into a plurality of discs or units for connection in series is not necessary.

In the following description, reference will be made to "ferritic" stainless steel. A suitable formulation for this alloy is described in U.S. Pat. No. 4,414,023 dated Nov. 8, 1983 to Aggens et al. A specific ferritic stainless steel alloy useful in the devices hereof contains 20% chromium, 5% aluminum, and from 0.002% to 0.05% of at least one rare earth metal selected from cerium, lanthanum, neodymium, yttrium, and praseodymium, or a mixture of two or more rare earths, balance iron and steel making impurities.

In the following description, reference will also be made to fibrous ceramic mat or insulation. Reference may be had to U.S. Pat. No. 3,795,524 dated Mar. 5, 1974 to Bowman for formulations and manufacture of ceramic fibers and mats useful herein. One such material is currently available from 3-M under the registered trademark "INTERAM."

In the following description, reference will also be made to brazing foil. This foil is cast to about 0.001" to about 0.003" thick. It is desirably a nickel-chromium-boron-silicon brazing alloy analyzing 75% to 83% nickel with a liquidus temperature of 2100 F to 2300 F. Other nickel-containing brazing alloys 7% to 14% chromium, 3% to 4.5% iron, 3.5% to 4.5% silicon, 2% to 3% boron, balance nickel and having a liquidus temperature of above about 2100 F may also be used. Phosphorus in the alloy is to be avoided where platinum is used as the catalyst. Such alloys are available currently from Allied Metglas Products in Parsippany, N.J.

Many millions of automotive vehicles are equipped with catalytic converters, but virtually all are subject to start-up emissions of what, in at least one state, has been determined to be an unacceptable level. Anticipatory elevation of the catalyst temperature to an optimum operating level before start-up is expected to be mandated for many, if not all cars.

The metal monolith devices utilize, in the preferred embodiments, an elongated corrugated thin stainless steel strip, corrugated in such a manner as to be nonnesting when accordion folded, or when spirally wound about a central core. The corrugations may be, therefore, herringbone or chevron shaped, having a V-cross section with the apices rounded to reduce stress, or they may be straight through according to a variable pitch scheme such as described in U.S. Pat. No. 4,810,588 to Bullock and Whittenberger dated Mar. 7, 1989. Because of a tendency for the leading edges of corrugated thin metal strips at high gas space velocities on the order of 1,000,000 volume/volume/hour to roll over and induce destruction of the catalytic converter unit, it has now been found that a composite foil structure formed of corrugated and flat foil members will enable the core formed therefrom to withstand such velocities without failure.

BRIEF STATEMENT OF THE INVENTION

Briefly stated, the present invention is a core member for an electrically heatable catalytic converter core comprising (a) at least one nonnesting corrugated thin metal foil strip having a predetermined length and a predetermined width, the length being greater than the width, and, in laminar relation therewith, (b) at least one flat thin metal foil strip having a width substantially less than said predetermined width. To form a core body, said foils are spirally co-wound about an electrically conducting central metal post and a retainer shell placed about the periphery of the spiral winding and electrically connected thereto. A catalytic converter is formed by providing suitable electrical terminals to the central post and to the retainer, respectively, placing this unit in a suitable housing adapted for insertion in an exhaust line, and with insulation between the housing and the core.

BRIEF DESCRIPTION OF THE DRAWINGS

Reference may be had to the annexed drawings showing preferred embodiments of the present invention, and wherein:

FIG. 13 shows in diagrammatic and schematic form an internal combustion engine and an exhaust system containing an electrically heatable catalytic converter and a conventional catalytic converter in tandem relation.

DETAILED DESCRIPTION OF THE EMBODIMENTS IN THE DRAWINGS

As indicated above, a problem exists with spirally wound and accordion folded corrugated thin metal foil monoliths, especially those having high pitch and amplitude values for the corrugations (for example, 0.1" to 0.2" pitch and 0.07" to 0.15" amplitude). This is the tendency under a severe screening test for the leading edge of the foil to roll over and eventually destroy the integrity of the monolith core. The test involves oscillating (100–200 Hertz and 28 to 60 G) the device (such as shown in FIG. 13) in a vertical attitude at high temperature (between 700 and 950 C; 1292 F and 1742 F, respectively) with exhaust gas from a running internal combustion engine being passed through the device. If the device telescopes or breaks up after a predetermined time, e.g., 5 to 200 hours, the device is said to fail the test. Usually, the test device will fail in 5 hours if it is going to fail.

Figure 1:
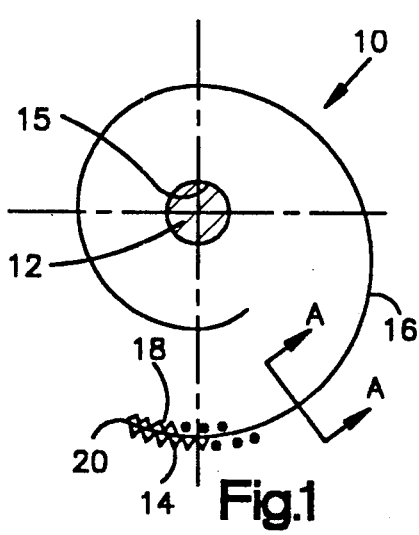
FIG. 1 shows an end view of a core element spirally would about a central electrically conducting post in somewhat expanded condition, i.e., not tightly wound.
Figure 4:
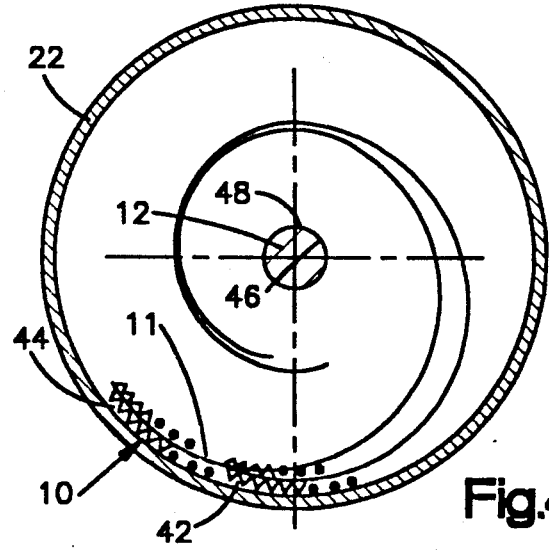
FIG. 4 shows a cross-sectional view of a tightly wound core body encased in a retainer shell of circular cross-section.

Referring now, more particularly, to FIG. 1, there is shown a core element 10 in accordance herewith in cross-sectional view loosely spirally wound about a central core post 12. The core element 10 is welded or brazed to the center post 12. The core element is composed of an outer layer of herringbone corrugated ferritic stainless steel 14, an intermediate layer of flat ferritic stainless steel 16, and an inner layer (with reference to a clockwise spirally wound core element 10 as shown in FIG. 1) of herringbone corrugated ferritic stainless steel 18. The corrugated thin ferritic stainless steel strips are formed in accordance with the process described in the aforesaid patent to Cornelison et al U.S. Pat. No. 4,711,009 and recovered as elongated strips without going through the creasing and accordion folding steps described in that patent. Thus, the herringbone corrugated strips have the gamma alumina coating and the noble metal catalyst thereon. In order to effect welding of the core element to the central post 12, one end 15 of the strip should be flattened and wirebrushed for a distance of about ¼ inch to remove the alumina coating as the brazing material will not adhere well to such a coating. Likewise, the free end 20 should also be cleaned of any alumina coating to enable welding or brazing to the retaining shell 22 (FIG. 4). The central post 12 may be a solid bar or a closed tube of ferritic stainless steel or nickel.

The corrugated thin metal strip 14 or 18 is from about 1.5" to about 3.5" wide, from 24 to 32 inches long, and has corrugations of triangular cross-section preferably rounded at the apices, or truncated triangular cross-section, such as shown in FIG. 4 of U.S. Pat. No. 4,838,067 to Cornelison dated Jun. 13, 1989. The truncated triangular pattern of the herringbone or chevron pattern is preferred to reduce stress in the metal where failure may begin. The sides of the herringbone, or chevron corrugations are about 0.75 to 1.5" long and lie at an angle of from about 3 degrees to about 10 degrees, for example about 5 degrees, to a line perpendicular to the edges of the foil. In the case of a truncated triangular configuration the truncation line is perpendicular to the edges of the foil. In general, these corrugations have an amplitude of from 0.02" to about 0.25", and a pitch or wavelength of from about 0.03" to about 0.25". To cut down on the amount of catalyst, which is very expensive, and the pressure drop through the monolith, the higher end of the range of pitch and amplitude is preferred, e.g., a pitch of 0.1 to 0.2" and an amplitude of 0.05" to about 0.1".

Figure 2:
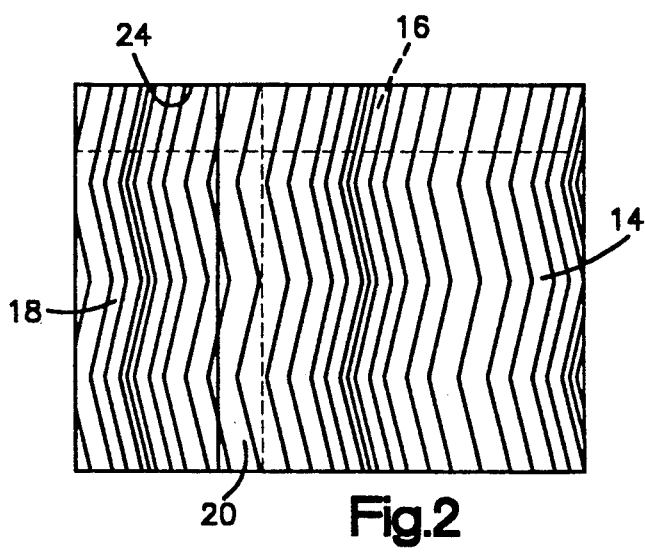
FIG. 2 is a side view of the core shown in FIG. 1.
Figure 3:
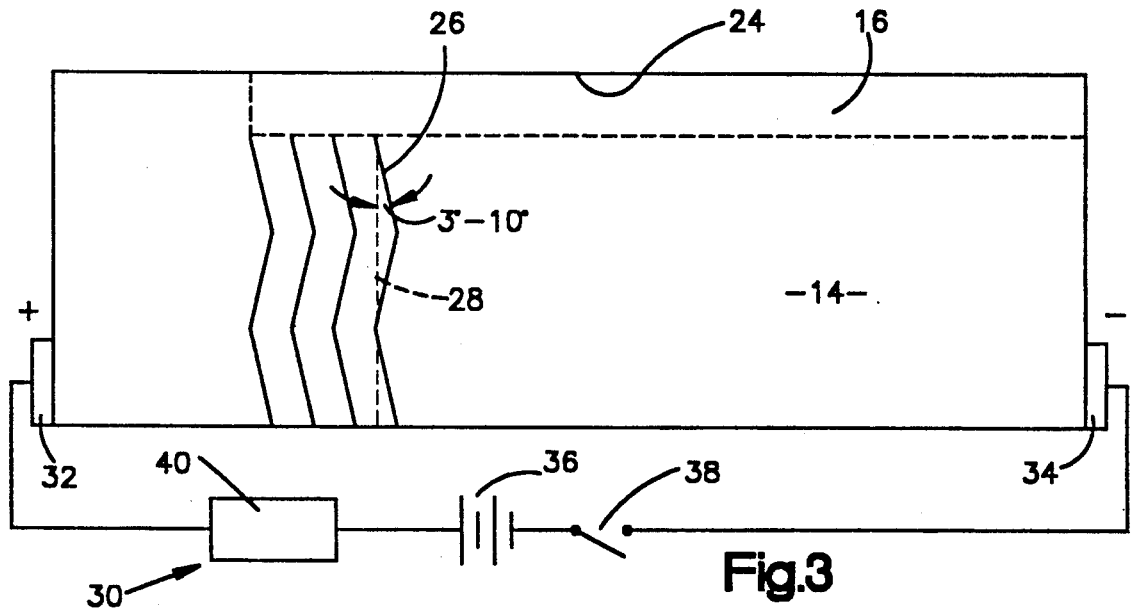
FIG. 3 is a development of the core member showing the points of application of voltage and the location of the composite strip.

The flat strip 16 is essentially a reinforcing element for the leading edge 24 (FIG. 3) of the corrugated strips 14 and 18. As shown in FIGS. 2 and 3, the narrower flat thin metal foil strip 16 shown by dotted lines, extends along the upper longitudinal marginal edge 24 of the corrugated thin metal strip 14. The flat thin metal foil strip 16 is shown in FIG. 1 in edge view where it is arrayed with corrugated thin metal strips 14 and 18 in contiguous relation therewith. This strip 16 is desirably formed of ferritic stainless steel and is adapted to be co-wound about the central post 12. It is important to note that the width of the strip 16 is less than the width of the corrugated strips 14 and 18, e.g., from about 1/10 to about ⅓ of the width of the corrugated thin metal strips 14 and 18. The strip 16 is from about 0.001" to about 0.005" thick.

Stability of the tightly spirally wound core against axially telescoping and/or rolling over is desirably achieved by brazing with either brazing foil, used for example, as described below, or by dipping at least one end of the core into molten brazing metal and allowing a small amount of the brazing metal to wick up into the core a short distance, e.g. about ⅛ to ½ an inch.

FIG. 2 is a side view of the spirally wound core element of FIG. 1. There is shown the outer herringbone corrugated thin stainless steel strip 14 and the inner herringbone corrugated thin stainless steel strip 18. Between the strips 14 and 18 there is provided in this embodiment a narrow strip 16 (shown in phantom) of flat stainless steel along a part of the leading edge 24 as a reinforcing element. The leading edge 24 is the edge that first contacts the exhaust gas as it flows through the monolith. Also shown is the free end 20 of the core element 10 having the alumina coating removed for about ¼ inch.

FIG. 3 is a development of the core element 10 in plan view. There is shown the outer herringbone corrugated thin stainless steel strip 14 with a flat stainless steel reinforcing strip 16 along the leading edge 24. A side 26 of the herringbone corrugation is shown lying at an angle of from 3 degrees to 10 degrees to a line 28 normal to the marginal edges of the strip 14. Also shown in diagrammatic form is an electrical circuit 30 having a positive terminal 32 and a negative terminal 34 attached to opposite ends of the corrugated strip 14. The resistance of the corrugated thin metal strip 14 over its length, which is from about 6 to 32 inches, enables the core element 10 to be electrically heated. The electrical circuit 30 includes a battery 36 rated at from 12 to 108 volts, a switch 38, and a power control system 40 such as described in our co-pending application Ser. No. 587,219, supra. The positive terminal 32 corresponds to the central post 12 and the negative terminal 34 corresponds to the retaining shell 22 in FIG. 4.

FIG. 4 shows the core element 10 and a second core element 11 of the same layering pattern as in core element 10, tightly spirally wound about the center post 12 and fitted with a stainless steel or nickel retaining shell 22. The core element 10 is welded or brazed to the retaining shell 22 at 42 and the core element 11 is welded or brazed to the retaining shell 22 at 44. The other end of the core elements 11 and 10 are brazed or welded to the central post 12 as at 46 and 48, respectively.

Figure 5:
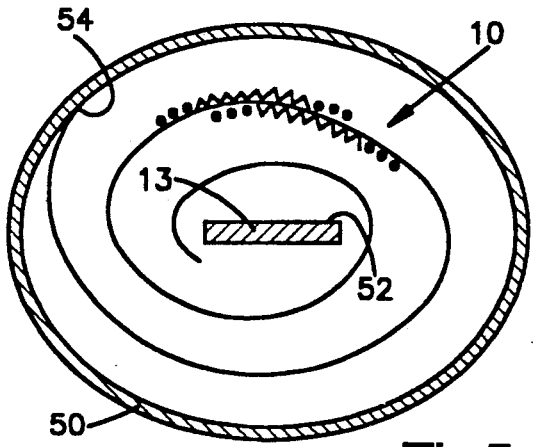
FIG. 5 shows a cross-sectional view of a tightly wound core body encased in a retainer shell of oval cross-section.

FIG. 5 shows a device similar to that shown in FIG. 4 except that the core element 10 is encased in an oval retaining shell 50. One end is welded or brazed to the flat central bar 13 as at 52, and the free end is welded or brazed to the retaining shell 50 as at 54.

The series of dots following the zig-zag spiral lines in FIGS. 1, 4 and 5 indicate a continuation of the corrugations to the next series of dots followed by a zig-zag line; that is, the corrugated foil strips are continuously corrugated from the point of attachment to the central electrically conducting post 12 (FIG. 4) or 13 (FIG. 5) to the outer shell 22 (FIG. 4) or shell 50 (FIG. 5).

Figure 6:
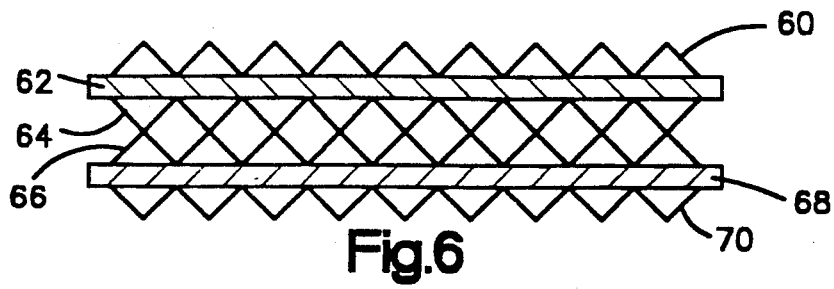
FIG. 6 is a fragmentary cross-section on an enlarged scale as the core member appears in the plane indicated by the line A—A in FIG. 1.

FIGS. 6 to 10 inclusive show various layering schemes for the corrugated thin metal strips and the relatively narrower flat metal strips. Note that the flat metal strips may be brazing metal or stainless steel. In FIG. 6 there is shown a corrugated layer 60 followed by a flat stainless steel layer 62, a corrugated layer 64, another corrugated layer 66, a flat stainless steel layer 68 and a corrugated layer 70, all in contiguous relationship. This arrangement, in the order named, is repeated as may be necessary to provide the desired exhaust gas intercepting face. Alternatively, the basic arrangement illustrated in FIG. 6 may be enclosed in a retaining shell, such as shown in FIG. 4 or FIG. 5, and another like arrangement wrapped around the outside of the retainer shell, such as the retainer shell 22 in FIG. 4, and the whole assembly encased in a second retaining shell and suitably electrically connected to the first arrangement.

Figure 7:
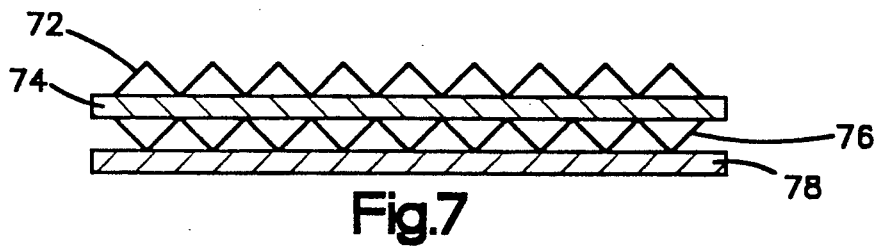
FIG. 7 is another fragmentary cross-section on an enlarged scale showing a different layering of the components of the core member as it may appear in the plane indicated by the line A—A in FIG. 1.

FIG. 7 shows a corrugated layer 72 followed by a flat stainless steel layer 74, a corrugated layer 76 and another flat stainless steel layer 78 all in contiguous relationship. As many of these layered arrangements, in the order named, as necessary to provide the required gas intercepting face are provided.

Figure 8:
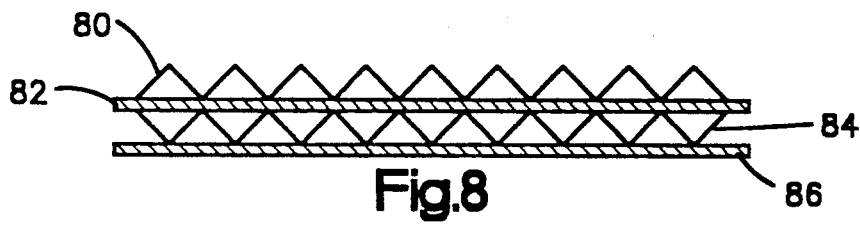
FIG. 8 is still another fragmentary cross-section on an enlarged scale showing another layering of the components of the core member as it may appear in the plane indicated by the line A—A in FIG. 1.

FIG. 8 shows a corrugated layer 80 followed by a flat brazing strip layer 82, a corrugated layer 84 and a flat brazing strip layer 86. As many of these layered arrangements, in the order named, as necessary to provide the required gas intercepting face are provided. When brazing strips are a part of the assembly, the tightly wound core must be heated to a temperature sufficient to fuse the brazing metal. Induction heating to a limited depth is desired to avoid damage to any catalyst present.

Figure 9:
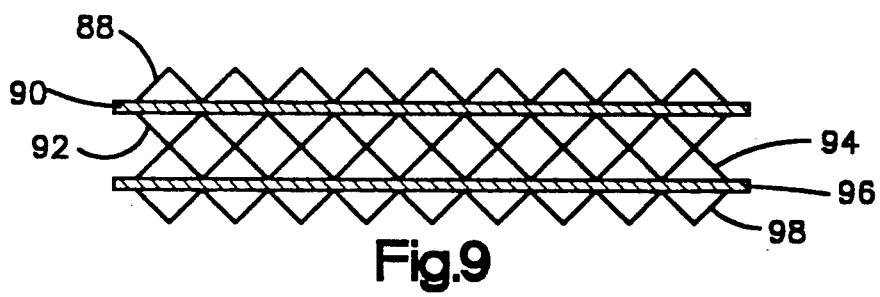
FIGS. 9 and 10 are other fragmentary cross-sections, respectively, showing other layering arrangements of the components of the core member as they appear in the plane indicated by the line A—A in FIG. 1.

FIG. 9 shows a corrugated layer 88 followed by a flat brazing strip 90, a corrugated strip 92, a corrugated strip 94, a flat brazing strip 96 and a corrugated strip 98. As many of these layered arrangements, in the order named, as necessary to provide the required gas intercepting face are provided.

Figure 10:
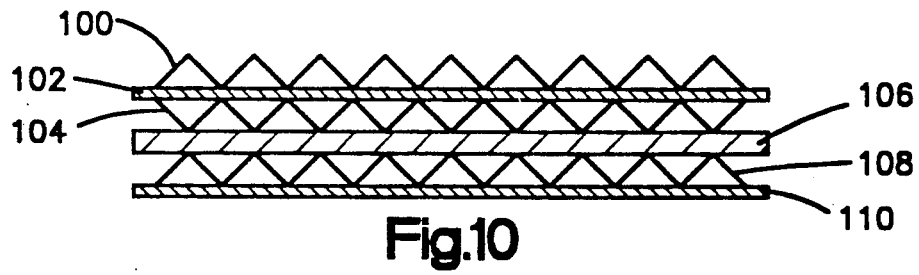

FIG. 10 shows another layering arrangement in accordance with the present invention. There are provided, in the order named, a corrugated layer 100 followed by a flat brazing strip 102, a corrugated strip 104, a flat metal strip 106, a corrugated metal strip 108, and a flat brazing strip 110.

Other arrangements, not shown, include a corrugated layer followed by a brazing foil strip, a flat steel layer, a brazing strip, one or two corrugated strips, etc. for example. Also where there is a flat stainless steel strip in contiguous relation with a corrugated strip, a brazing strip may be interposed on either side of the flat stainless steel strip, as for example, a corrugated layer followed by a flat brazing strip, the flat stainless steel strip, a flat brazing strip, a corrugated strip, etc, the whole sequence being repeated again.

In the foregoing FIGS. 6-10, the corrugated strips are as described in connection with the discussion of FIG. 1. The flat metal strips are flat stainless steel strips having a thickness of from 0.001" to 0.005" and a width less than the width of the corrugated metal strips. The flat brazing strips are desirably those described above as being commercially currently provided by Allied Metglas Products of Parsippany, N.J. The brazing strips should desirably have a liquidus or fusion point higher than the anticipated highest temperature encountered in actual use. 2100 F. to 2300 F. has been found to be satisfactory.

Figure 11:
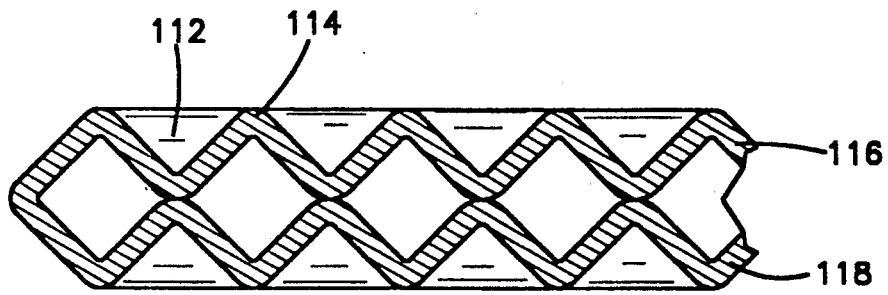
FIG. 11 is a cross-sectional view of contiguous herringbone corrugated thin metal sheets showing the nonnesting relationship.

FIG. 11 shows a typical nonnesting relationship between contiguous layers 116 and 118 of a triangular cross-section herringbone corrugated thin metal foil. Here, the apices of the triangular configuration are rounded to reduce stress in the metal. The drawing shows valleys 112 and peaks 114 that are introduced by rolling a thin flat metal strip through corrugating rolls as described in the aforesaid U.S. Pat. No. 4,711,009.

Figure 12:
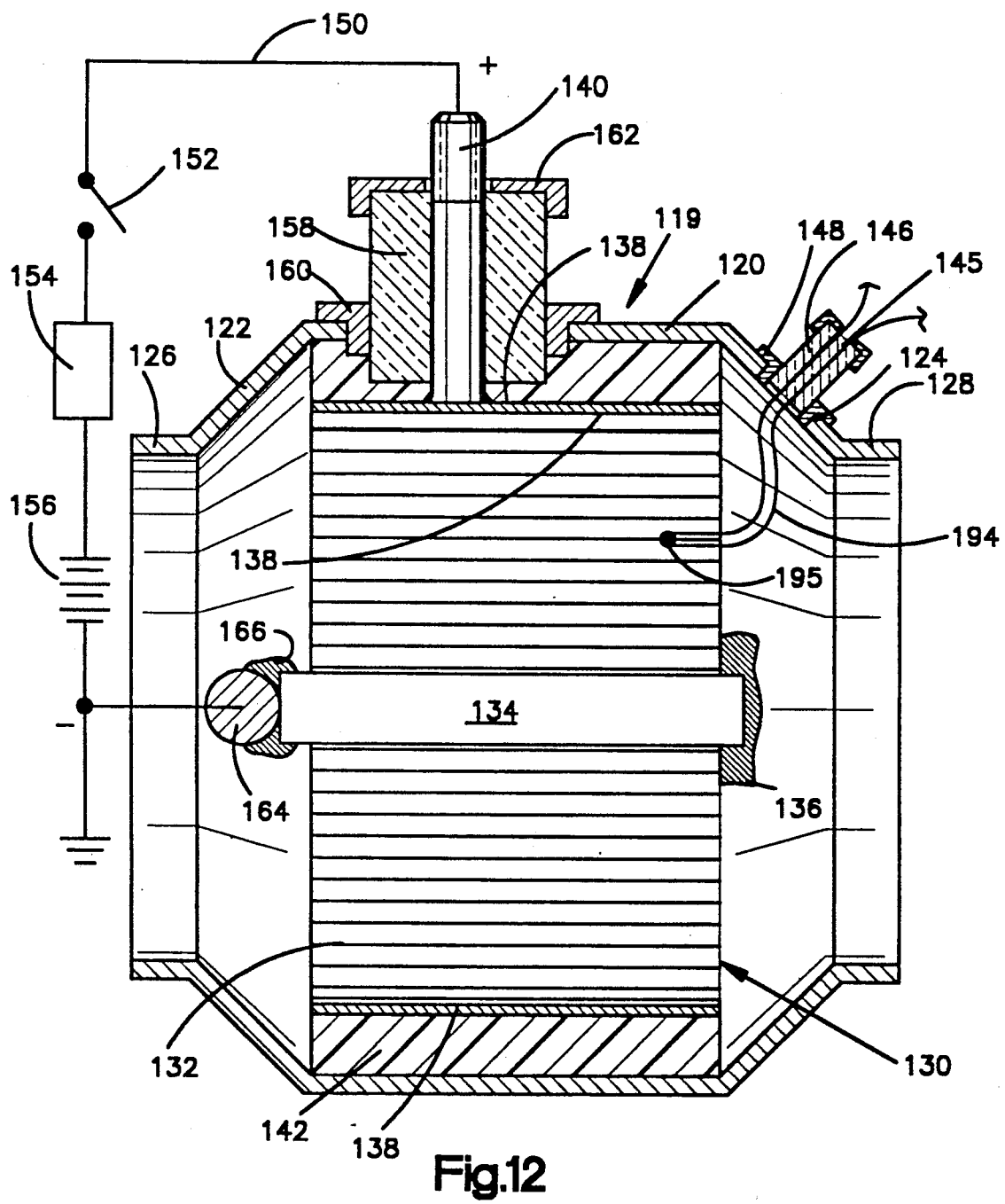
FIG. 12 is a cross-sectional view of an electrically heatable catalytic converter in accordance herewith and the attendant electrical circuit diagrammatically shown.

FIG. 12 shows in axial cross-section a completely assembled electrically heatable catalytic converter generally indicated at 119, in accordance herewith and adapted to be inserted in an exhaust line from an internal combustion engine. The converter is provided with a stainless steel or nickel housing 120 having flared end caps 122 and 124 and nipples 126 and 128 integral therewith adapted to accommodate a standard exhaust pipe, e.g., a 2.5" internal diameter pipe. The housing 120 contains a single monolith 130 which, for example, is a monolith such as shown in FIG. 4 and formed in the manner indicated above of refractory metal oxide coated, e.g., gamma alumina/ceria coated corrugated thin ferritic stainless steel in one of the relationships shown in FIGS. 6-10 and defining a plurality of cells permeable to exhaust gas. Such cells are diagrammatically shown in FIG. 12 as a plurality of parallel lines. As indicated above, these cells may be non-straight-through as produced with a herringbone or chevron pattern, or straight-through as described above with reference to U.S. Pat. No. 4,810,588, supra. The refractory metal oxide coating is very thin, e.g., about 0.0005" to 0.002" and is applied as a washcoat and baked to fuse the coating to the stainless steel surface. The gamma form of alumina is desired. Other refractory metal oxides or mixtures of oxides may be used as the washcoat, e.g., titania, titania/ceria, titania/alumina, alumina/ceria, etc. As indicated above, reference may be had to U.S. Pat. No. 4,711,009 for procedure for corrugating, washcoating, and application of a noble metal catalyst to the foil.

Strips 132 of the corrugated ferritic stainless steel foil are cut to be predetermined length, layered as described above, the resulting composite secured at one end to a central post 134. One or more of the composites may be secured to the central post 134, e.g., 1, 2, 3, etc. such composites. A button 136 may be welded on the end of the central post 134 to close the open end thereof if a tubular post is used. With a solid rod as the central post 134, or a post such as shown in FIG. 14 is used, such a button 136 is not necessary. The composite strips 132 are then tightly spirally wound about the central post 134 to which post they are welded or brazed after removal of the alumina coating in the end area where welding or brazing occurs. The alumina coating has also been removed from the free end of the composite strips 132, the whole bundle then wrapped with a brazing foil strip and a retaining shell 138 placed about the bundle, preferably as two half-shells, one having a suitable terminal post 140 extending therefrom for attachment of a cable from a voltage source. The half shells are seam welded together. The assembly is heated to fusion temperature to effect brazing to the retaining shell 138. If the brazing temperature is found to be too high for the catalyst, the application of the catalyst may be deferred until after the brazing step, the catalyst then being applied by dipping and baking at a lower temperature.

This assembly is then wrapped in insulation 142 desirably about 1/16 to ¼ inch thick and inserted into the housing 120. A suitable ceramic felt is described in U.S. Pat. No. 3,916,057 to Hatch dated Oct. 28, 1975. The end caps 122 and 124 are the last to be attached as by welding. by insulator 146 and bushing 148 extending through the end cap 124.

The terminal post 140 extends through the housing 120 and is desirably threaded at its distal extremity to accept a nut to hold a cable schematically shown at 150 leading through a switch 152 and a power switching means 154 as above described. Desirably the post 140 is attached to the positive pole of a direct current or rectified current source. The power switching means 154 is connected to a battery 156 or alternator, or both, to provide a driving force or voltage of from 12 to 108 volts. The post 140 is provided with an insulating sleeve 158 and a bushing 160 and a metal cap 162 as a seat for the cable connector, not shown.

The opposite, or negative pole in this case, is connected from the outside of the housing 120 by a transversely extending bar 164 welded at each end to the inside of the housing 120 and to which the central post 134 is welded as at 166. Thus, the electrical circuit is completed from the central post 134, through the foil composites 132, through the retaining shell 138 and terminal 140.

The cell density is in the range of from about 75 to 500 cells per square inch, preferably from about 100 to about 200 cells per square inch.

The catalytic converters hereof are referred to as "electrically heatable." This is to suggest that electric power is supplied for a small portion of the time the engine is at rest prior to start-up, and if necessary, during operation at any time the temperature falls below a set point. This can be achieved by temperature controls at critical points, e.g., within the respective catalytic converters, which respond to low temperatures to cause reapplication of power as may be needed.

Referring now to FIG. 13, there is here shown a diagrammatic representation of an internal combustion engine generally indicated at 170 shown in block phantom having a manifold 172 connected to individual cylinder exhaust lines 174, 176, 178 and 180 leading from exhaust ports 182, 184, 186, and 188, respectively, in the engine block 170. At the downstream end of the manifold 172, there is inserted in the exhaust system, generally indicated at 190, an electrically heatable catalytic converter 192 shown in greater detail in FIG. 12. The distance "a" in FIG. 13 is, for most purposes, less than about 12 inches. Also located in the exhaust line is a conventional catalytic converter 194, not electrically heatable. The downstream end of the manifold 172 is attached to the conventional catalytic converter 194 at its inlet end 196 and the tail pipe attached to the exit 198 from the converter 194. The exhaust pipe 190 enters the electrically heatable catalytic converter 192, as defined herein, at its inlet 200 and exits through the outlet 202. As shown, the electrically heatable catalytic converter 192 is upstream of the conventional catalytic converter 194. herein, at its inlet 200 and exits through the outlet 202. As shown, the electrically heatable catalytic converter 192 is upstream of the conventional catalytic converter 194. The conventional catalytic converter 194 may comprise a steel housing with end cap adapters to the exhaust pipe diameter and a ceramic monolith including a catalyst, catalyst coated alumina beeds, or a corrugated thin metal foil monolith as described in the aforesaid U.S. Pat. No. 4,711,009.

Where the engine is constructed with two manifolds, as in a V-8 or a V-6 engine, two electrically heatable catalytic converters may be used, one in each of the exhaust systems in the same manner as shown in FIG. 13.

In operation, the electrically heatable catalytic converter as described herein is connected in a suitable electric circuit by closing a normally open switching circuit containing one or more MOSFET's in parallel until a desired temperature is reached in a period of time of from 2 to 30 seconds, or in the event of cold weather operation, until the exhaust system reaches normal operating temperature. At such time as the main, or conventional, catalytic converter has achieved optimum temperature for the desired conversion of pollutant ingredients, application of electrical power may be discontinued or controlled at a much lower energy level. Also, these MOSFET switches may be turned back on after engine start-up to maintain temperature, which temperature, in many cases, will drop in the absence of additional power, because of the mass flux in the initial cool exhaust gas flow. Moreover, these MOSFET switches can be turned on and off rapidly so as to provide just the right amount of power to balance the cooling effect. Closing of the MOSFET switch may also activate a "wait" light visible to the driver, and/or disable the ignition switch until minimum catalyst operating temperature is reached as sensed by a conventional thermocouple as above described. For further details of a MOSFET power control system, reference may be had to our co-pending application Ser. No. 587,219, supra.

There has thus been provided an improved electrically heatable catalytic converter characterized by a novel core member comprising layers of corrugated thin metal an flat metal, the flat metal being narrower than the corrugated thin metal. These devices resist the tendency of the edges of the corrugated strips to roll over under a sever screening test involving high exhaust gas velocity, high temperatures, and high vibrations.

What is claimed is:

1. A core member for an electrically heatable catalytic converter comprising (a) a nonnesting corrugated thin metal foil strip having a predetermined length and a predetermined width, the length being greater than the width, and (b) at least one flat thin metal foil strip having a width substantially less than said predetermined width and in contiguous relation therewith, one longitudinal marginal edge of said flat thin metal foil strip lying along a longitudinal marginal edge of said corrugated thin metal foil strip, and substantially coextensive therewith, said foils being spirally co-wound about an electrically conducting central post.

2. A core member as defined in claim 1 further comprising at least one of the foils (a) and (b) having a refractory metal oxide coating on a portion of at least one surface thereof, and a noble metal catalyst deposited on said refractory metal oxide surface.

3. A core member as defined in claim 2 wherein the refractory metal oxide coating comprises a major proportion of alumina.

4. A core member as defined in claim 3 wherein the alumina is gamma alumina.

5. A core member as defined in claim 1 wherein the flat thin metal foil strip is a stainless steel metal foil strip.

6. A core member as defined in claim 5 wherein the stainless steel metal foil is a ferritic stainless steel.

7. A core member as defined in claim 1 wherein the flat thin metal foil is a brazing metal foil.

8. A core member is defined in claim 7 wherein the brazing metal foil is a nickel/chromium/boron alloy.

9. A core member as defined in claim 5 wherein the stainless steel foil is corrugated with a herringbone, chevron, or truncated herringbone pattern.

10. A core member as defined in claim 1 wherein the thin stainless steel has corrugations parallel to each other and arrayed in a plurality of sequential repeating units, each of said repeating units including a plurality of pitches from peak to peak of the corrugations, the length of the repeating unit being no greater than the length of the smallest chord to be made, and the length of each pattern being constant within a repeating unit.

11. A core member as defined in claim 1 wherein the corrugations have a pitch of from about 0.02" to about 0.2" and an amplitude of from about 0.02" to about 0.25", and the cross-section of the corrugation is generally triangular with the apices rounded.

12. A core member as defined in claim 1 wherein the foils (a) and (b) each have a thickness of 0.001" to 0.005".

13. A core member as defined in claim 7 wherein the slope of the sides of the herringbone or chevron pattern is from 3 degrees to about 10 degrees to a line perpendicular to the edges of the foil.

14. A core for an electrically heatable catalytic converter including a core member comprising (a) nonnesting corrugated thin stainless steel foil strip having a predetermined length and a predetermined width, the length being greater than the width, and (b) at least one flat thin metal foil strip having a width less than said predetermined width, and in contiguous relation therewith, one longitudinal margin edge of said flat thin metal foil strip lying along a longitudinal margin edge of said corrugated thin metal foil strip, and substantially coextensive therewith, said foils being spirally co-wound about an electrically conducting central metal post, and including a retaining shell tightly surrounding said core and being electrically bonded thereto.

15. A core as defined in claim 14 wherein the geometric configuration of the shell is circular.

16. A core as defined in claim 14 wherein the geometric configuration of the shell is oval.

17. A core as defined in claim 14 wherein a line drawn from the intersection of orthogonally related axes passing through the center of symmetry of the geometric configuration of said housing to the periphery of said shell passes through foils arrayed in the order:
 a) corrugated
 b) flat stainless steel strip
 c) corrugated
 d) corrugated
 e) flat stainless steel strip
 f) corrugated, etc.

18. A core as defined in claim 14 wherein the foils are arrayed in the order:
 a) corrugated
 b) flat stainless steel strip
 c) corrugated
 flat stainless steel strip, etc.

19. A core as defined in claim 14 wherein the foils are arrayed in the order:
 a) corrugated
 b) flat brazing strip
 c) corrugated
 d) flat brazing strip, etc.

20. A core as defined in claim 14 wherein the foils are arrayed in the order:
 a) corrugated
 b) flat brazing strip
 c) corrugated
 d) corrugated
 e) flat brazing strip
 f) corrugated, etc.

21. A core as defined in claim 14 wherein the foils are arrayed in the order:
 a) corrugated
 b) flat brazing strip
 c) corrugated
 d) flat stainless steel strip
 e) corrugated
 f) flat brazing strip, etc.

22. A core as defined in claim 14 wherein the foils are arrayed in the order:
 a) corrugated
 b) flat brazing strip
 c) flat stainless steel strip
 d) flat brazing strip
 e) corrugated, etc.

23. A core as defined in claim 14 wherein the foils are arrayed in the order:
 a) corrugated
 b) flat brazing strip
 c) flat stainless steel strip
 d) flat brazing strip, etc.

24. A core as defined in claim 14 wherein the foils are arrayed in the order:
 a) corrugated
 b) flat brazing strip
 c) corrugated
 d) flat brazing strip
 e) flat stainless steel strip
 f) flat brazing strip, etc.

25. A core as defined in claim 14 including means for connecting the central post to one pole of a direct current voltage source, and including means for connecting the housing to the other pole of said direct current voltage source.

26. A core as defined in claim 26 further including a direct current voltage source having a voltage rating of from 12 to 108 volts.

27. An electrically heatable catalytic converter for treating exhaust gas emanating from an internal combustion engine to remove pollutant materials therefrom, said converter including (1) an outer metallic shell, (2) means at each end of the shell for adapting the configuration of the outer metallic shell for insertion into a conventional exhaust system for said internal combustion engine, (3) an insulating liner for the inner walls of said outer shell, (4) a core for said converter within said insulating liner including a core member comprising (a) nonnesting corrugated thin stainless steel foil strip having a predetermined length and a predetermined width, the length being greater than the width, and (b) at least one flat thin metal foil strip having a width less than said predetermined width, and in contiguous relation therewith, one longitudinal marginal edge of said flat thin metal foil strip lying along a longitudinal marginal edge of said corrugated thin metal strip and substantially coextensive therewith, said foils being spirally co-wound about an electrically conducting central metal post, and including a retaining shell tightly surrounding said core and being electrically bonded thereto, (5) means for connecting said central post to one pole of a direct current voltage source, (6) means for connecting said retaining shell to the other pole of a direct current voltage source, and (7) a direct current voltage source rated at from 12 to 108 volts.

* * * * *

UNITED STATES PATENT AND TRADEMARK OFFICE
CERTIFICATE OF CORRECTION

PATENT NO. : 5,170,624

DATED : December 15, 1992

INVENTOR(S) : Richard C. Cornelison

It is certified that error appears in the above-indentified patent and that said Letters Patent is hereby corrected as shown below:

Column 10, line 58, Claim 8, line 1, change "is" to "as"

Signed and Sealed this

Second Day of November, 1993

BRUCE LEHMAN

Attest:

Attesting Officer

Commissioner of Patents and Trademarks